United States Patent
Hui et al.

(10) Patent No.: US 10,952,174 B2
(45) Date of Patent: *Mar. 16, 2021

(54) DISTRIBUTED COORDINATION OF MESH NETWORK CONFIGURATION UPDATES

(71) Applicant: Google LLC, Mountain View, CA (US)

(72) Inventors: Jonathan Wing-Yan Hui, Belmont, CA (US); Martin A. Turon, Berkeley, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,969

(22) Filed: Sep. 3, 2019

(65) Prior Publication Data

US 2019/0394743 A1 Dec. 26, 2019

Related U.S. Application Data

(63) Continuation of application No. 15/157,118, filed on May 17, 2016, now Pat. No. 10,433,272.

(51) Int. Cl.
*H04L 12/24* (2006.01)
*H04W 56/00* (2009.01)

(52) U.S. Cl.
CPC ..... *H04W 56/0065* (2013.01); *H04L 41/0816* (2013.01); *H04L 41/0859* (2013.01)

(58) Field of Classification Search
CPC . H04W 56/0065; H04L 43/0852; H04L 45/44
USPC ........................................................ 370/254
See application file for complete search history.

(56) References Cited

U.S. PATENT DOCUMENTS

| 5,926,822 A | 7/1999 | Garman |
| 9,628,338 B2 | 4/2017 | Turon et al. |
| 10,433,272 B2 | 10/2019 | Hui et al. |
| 2005/0089327 A1* | 4/2005 | Ovadia ................. H04L 45/04 398/47 |
| 2010/0111523 A1* | 5/2010 | Hirth .................. H04J 14/0221 14/221 |
| 2012/0151234 A1* | 6/2012 | Teague .............. H04W 52/0229 713/323 |

(Continued)

OTHER PUBLICATIONS

"Final Office Action", U.S. Appl. No. 15/157,118, dated Jan. 28, 2019, 8 pages.

(Continued)

*Primary Examiner* — Christopher R Crompton
(74) *Attorney, Agent, or Firm* — Colby Nipper

(57) ABSTRACT

In embodiments of distributed coordination of mesh network configuration updates, pending commissioning datasets are managed and distributed to coordinate configuration changes of parameters that control participation in, and secure communication over, a mesh network. Pending network commissioning datasets are managed across fragmentation of the mesh network into multiple partitions and subsequent merging of the fragments to ensure that the most recent updates to pending commissioning datasets are propagated to mesh network devices and that all mesh network devices will receive pending commissioning datasets before the time that the pending commissioning dataset becomes the active commissioning dataset for the mesh network.

20 Claims, 10 Drawing Sheets

(56) References Cited

U.S. PATENT DOCUMENTS

| | | | |
|---|---|---|---|
| 2012/0233481 A1* | 9/2012 | Henttonen | G06F 1/329 |
| | | | 713/323 |
| 2013/0301471 A1 | 11/2013 | Brown et al. | |
| 2014/0007231 A1 | 1/2014 | Li et al. | |
| 2014/0219078 A1 | 8/2014 | Dasgupta et al. | |
| 2015/0156108 A1 | 6/2015 | Shi | |
| 2016/0071404 A1 | 3/2016 | Chiarizio et al. | |
| 2016/0255667 A1 | 9/2016 | Schwartz | |
| 2016/0323837 A1* | 11/2016 | Hartman | H04W 56/002 |
| 2017/0302524 A1* | 10/2017 | Iorga | H04L 45/021 |

OTHER PUBLICATIONS

"First Action Interview Office Action", U.S. Appl. No. 15/157,118, dated Feb. 7, 2018, 5 pages.
"Notice of Allowance", U.S. Appl. No. 15/157,118, dated May 23, 2019, 8 pages.
"Pre-Interview First Office Action", U.S. Appl. No. 15/157,118, dated Dec. 22, 2017, 4 pages.

* cited by examiner

DISTRIBUTED COORDINATION OF MESH NETWORK CONFIGURATION UPDATES

RELATED APPLICATION

This application claims priority to U.S. Non-Provisional patent application Ser. No. 15/157,118 filed May 17, 2016, the disclosure of which is incorporated by reference herein in its entirety.

BACKGROUND

Wireless mesh networking used to connect devices to each other, and to cloud-based services, is increasingly popular for sensing environmental conditions, controlling equipment, and providing information and alerts to users. To ensure the security of mesh networks, the identity of devices joining and operating on a mesh network is authenticated, and communication within the mesh network is encrypted, based on credentials that are commissioned into the devices. However many devices on mesh networks are designed to operate for extended periods of time on battery-power by turning off, or sleeping, many operations such as radio and network interfaces for periods of time. In the face of radio frequency interference or the failure of a device, a mesh network may separate into multiple partitions. Each partition elects a leader to maintain the commissioning dataset for the partition. If a commissioner attaches to one partition, not knowing that the separation occurred, changes to the commissioning dataset are only updated in that partition. When the partitions merge back together, or a device moves from one partition to another, differences between the original and updated commissioning dataset can prevent the partitions from successfully merging unless managing the differences in the commissioning datasets can be resolved so that all devices can again securely communicate.

SUMMARY

This summary is provided to introduce simplified concepts of distributed coordination of mesh network configuration updates. The simplified concepts are further described below in the Detailed Description. This summary is not intended to identify essential features of the claimed subject matter, nor is it intended for use in determining the scope of the claimed subject matter.

Distributed coordination of mesh network configuration updates is described, as generally related to managing commissioning datasets across the mesh network. In embodiments, a mesh network device receives a pending commissioning dataset that enables communication on a mesh network partition. The mesh network device initializes a delay timer with a delay timer value from the pending commissioning dataset. When the delay timer expires, the mesh network device applies parameter values from the pending commissioning dataset to corresponding parameters in an active commissioning dataset and operates on the mesh network partition using the updated active commissioning dataset.

In aspects of distributed coordination of mesh network configuration updates, a leader device receives a first pending commissioning dataset and propagates the first pending commissioning dataset to the mesh network. The leader device receives a second pending commissioning dataset from a node device in the mesh network and compares a first pending timestamp in the first pending commissioning dataset to a second pending timestamp in the second pending commissioning dataset. If the leader device determines that the second pending timestamp in the second pending commissioning dataset is newer than the first pending timestamp, the leader device propagates the second pending commissioning dataset to the mesh network.

BRIEF DESCRIPTION OF THE DRAWINGS

Embodiments of distributed coordination of mesh network configuration updates are described with reference to the following drawings. The same numbers are used throughout the drawings to reference like features and components.

DETAILED DESCRIPTION

Figure 1:
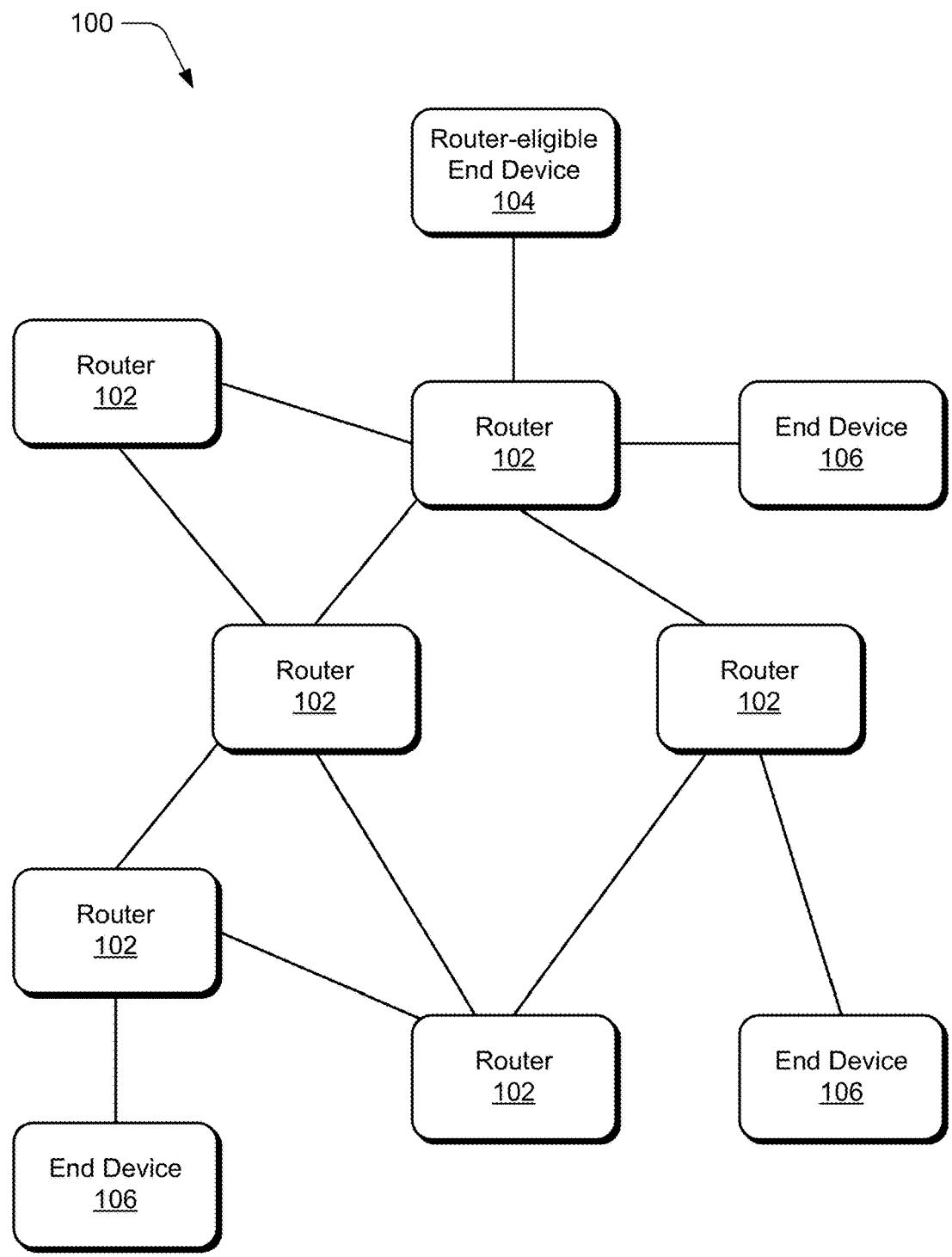
FIG. 1 illustrates an example mesh network system in which various embodiments of the distributed coordination of mesh network configuration updates can be implemented.

Wireless mesh networks are communication networks having wireless nodes connected in a mesh topology that provides reliable and redundant communication paths within a mesh network. Wireless mesh networks use multiple radio links, or hops, to forward data packets traffic between devices at the wireless nodes within the mesh network. This provides coverage for areas larger than the area covered by a single radio link.

Wireless mesh networks can be based on proprietary technologies, or standards-based technologies. For example, wireless mesh networks may be based on the IEEE 802.15.4 standard, which defines physical (PHY) layer and Media Access Control (MAC) layer features and services for use by applications at higher layers of a mesh networking stack. Upper-layer applications use these standards-defined services to implement application-level secure communication (e.g., encryption and authentication) across a mesh network.

To ensure secure communication and manage other aspects of mesh network operation, a user connects a commissioning device to the mesh network to update a commissioning dataset and/or to join new devices to the mesh network. The mesh network elects one router device to act as a leader to maintain, update, and propagate the commissioning dataset to the mesh network. The commissioning of mesh network devices is described in U.S. patent application Ser. No. 14/749,616 entitled "Mesh Network Commissioning" filed Jun. 24, 2015, the disclosure of which is incorporated by reference herein in its entirety.

When a new commissioning dataset is propagated to a mesh network, it is important that all the devices in a network transition to using the new commissioning dataset at approximately the same time to ensure that all of the devices in the mesh network can continue to communicate securely. However many devices on mesh networks are designed to operate for extended periods of time on battery-power by turning off, or sleeping, many operations such as radio and network interfaces for periods of time. Distributed coordination of mesh network configuration updates ensures the new commissioning dataset will not take effect until all the devices on the mesh network have received the new commissioning dataset, assuring uninterrupted secure communication across the mesh network.

When the timing is specified for a new commissioning dataset to take effect, partitioning and merging of portions of the mesh network between the propagation of the new commissioning dataset and the effective time of the new commissioning dataset may affect the transition to the new commissioning dataset. The content of the commissioning dataset may change in one partition or the specified timing may be adjusted in one of the partitions and not the other. Distributed coordination of mesh network configuration updates ensures that when the merger of the partitions occurs, or when a device moves from one partition to the other, differences in the commissioning datasets and the effective time for a new commissioning dataset are managed to maintain secure communications for the mesh network.

While features and concepts of the described systems and methods for the distributed coordination of mesh network configuration updates can be implemented in any number of different environments, systems, devices, and/or various configurations, embodiments of the distributed coordination of mesh network configuration updates are described in the context of the following example devices, systems, and configurations. Further, although examples of distributed coordination of mesh network configuration updates are described with respect to IEEE 802.15.4, the techniques described herein apply equally to any radio system and/or wireless network.

FIG. 1 illustrates an example mesh network system 100 in which various embodiments of the distributed coordination of mesh network configuration updates can be implemented. The mesh network 100 is a wireless mesh network that includes routers 102, a router-eligible end device 104, and end devices 106. The routers 102, the router-eligible end device 104, and the end devices 106, each include a mesh network interface for communication over the mesh network. The routers 102 receive and transmit packet data over the mesh network interface. The routers 102 also route traffic across the mesh network 100. The routers 102 and the router-eligible end devices 104 can assume various roles, and combinations of roles, within the mesh network 100, as discussed below.

The router-eligible end devices 104 are located at leaf nodes of the mesh network topology and are not actively routing traffic to other nodes in the mesh network 100. The router-eligible device 104 is capable of becoming a router 102 when the router-eligible device 104 is connected to additional devices. The end devices 106 are devices that can communicate using the mesh network 100, but lack the capability, beyond simply forwarding to its parent router 102, to route traffic in the mesh network 100. For example, a battery-powered sensor is one type of end device 106.

The routers 102, the router-eligible end device 104, and the end devices 106 include network credentials that are used to authenticate the identity of these devices as being a member of the mesh network 100. The routers 102, the router-eligible end device 104, and the end devices 106 also use the network credentials to encrypt communications in the mesh network.

During sleep periods, a child end device 106 that sleeps is not available on the mesh network 100 to receive data packets addressed to the child end device 106. The child end device 106 attaches to a parent router 102, which responds, on behalf of the child end device 106, to mesh network traffic addressed to the child end device 106.

The child end device 106 also depends on the parent router 102 to receive and store all data packets addressed to the child device 106, including commissioning datasets, which may be received while the child end device 106 is sleeping. When the child end device 106 awakes, the stored data packets are forwarded to the child end device 106. The parent router 102 responding on behalf of the sleeping child end 106 device ensures that traffic for the child end device 106 is handled efficiently and reliably on the mesh network 100, as the parent router 102 responds to messages sent to the child end device 106, which enables the child end device to operate in a low-power mode for extended periods of time to conserve power.

Figure 2:
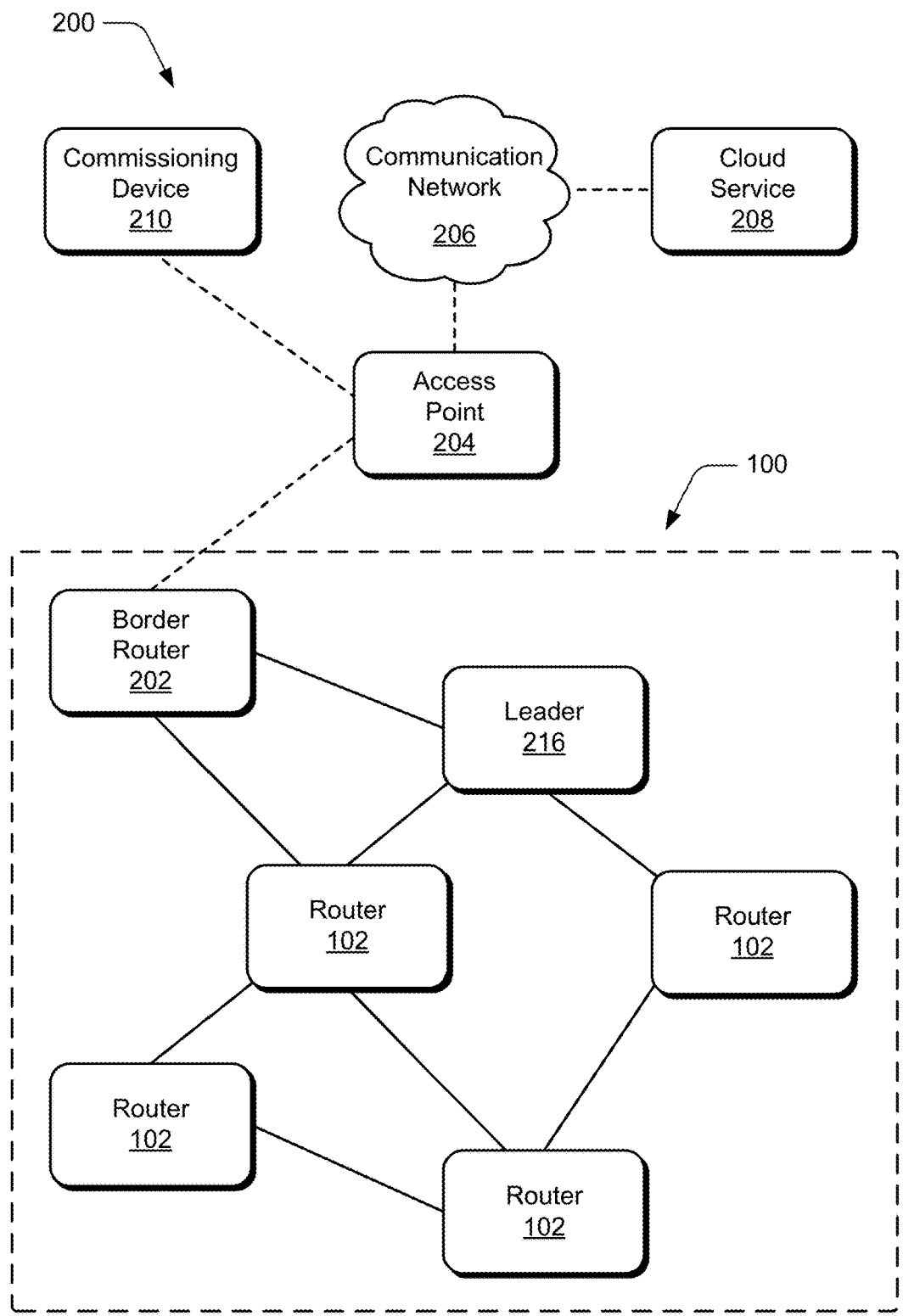
FIG. 2 illustrates an example environment in which various embodiments of the distributed coordination of mesh network configuration updates can be implemented.

FIG. 2 illustrates an example environment 200 in which various embodiments of the distributed coordination of mesh network configuration updates can be implemented. The environment 200 includes the mesh network 100, in which some routers 102 are performing specific roles in the mesh network 100. The devices within the mesh network 100, as illustrated by the dashed line, are communicating securely over the mesh network 100, using the network credentials.

A border router 202 (also known as a gateway and/or an edge router) is one of the routers 102. The border router 202 includes a second interface for communication with an external network, outside the mesh network 100. The border router 202 connects to an access point 204 over the external network. For example, the access point 204 may be an Ethernet router, a Wi-Fi access point, or any other suitable device for bridging different types of networks. The access point 204 connects to a communication network 206, such as the Internet. A cloud service 208, which is connected via the communication network 206, provides services related to and/or using the devices within the mesh network 100. By way of example, and not limitation, the cloud service 208 provides applications that include connecting end user devices, such as smart phones, tablets, and the like, to devices in the mesh network 100, processing and presenting data acquired in the mesh network 100 to end users, linking devices in one or more mesh networks 100 to user accounts of the cloud service 208, provisioning and updating devices in the mesh network 100, and so forth.

A user choosing to commission and/or configure devices in the mesh network 100 uses a commissioning device 210, which connects to the border router 202 via the external network technology of the access point 204, to commission and/or configure the devices. The commissioning device 210 may be any computing device, such as a smart phone, tablet, notebook computer, and so forth, with a suitable user interface and communication capabilities to execute applications that control devices to the mesh network 100. Only a single commissioning device 210 may be active (i.e., an active commissioner) on the mesh network 100 at time.

One of the routers 102 performs the role of a leader 216 for the mesh network 100. The leader 216 manages router identifier assignment and the leader 216 is the central arbiter of network configuration information for the mesh network 100. The leader 216 propagates the network configuration information to the other devices in the mesh network 100. The leader 216 also controls which commissioning device is accepted as a sole, active commissioner for the mesh network 100, at any given time.

Figure 3:
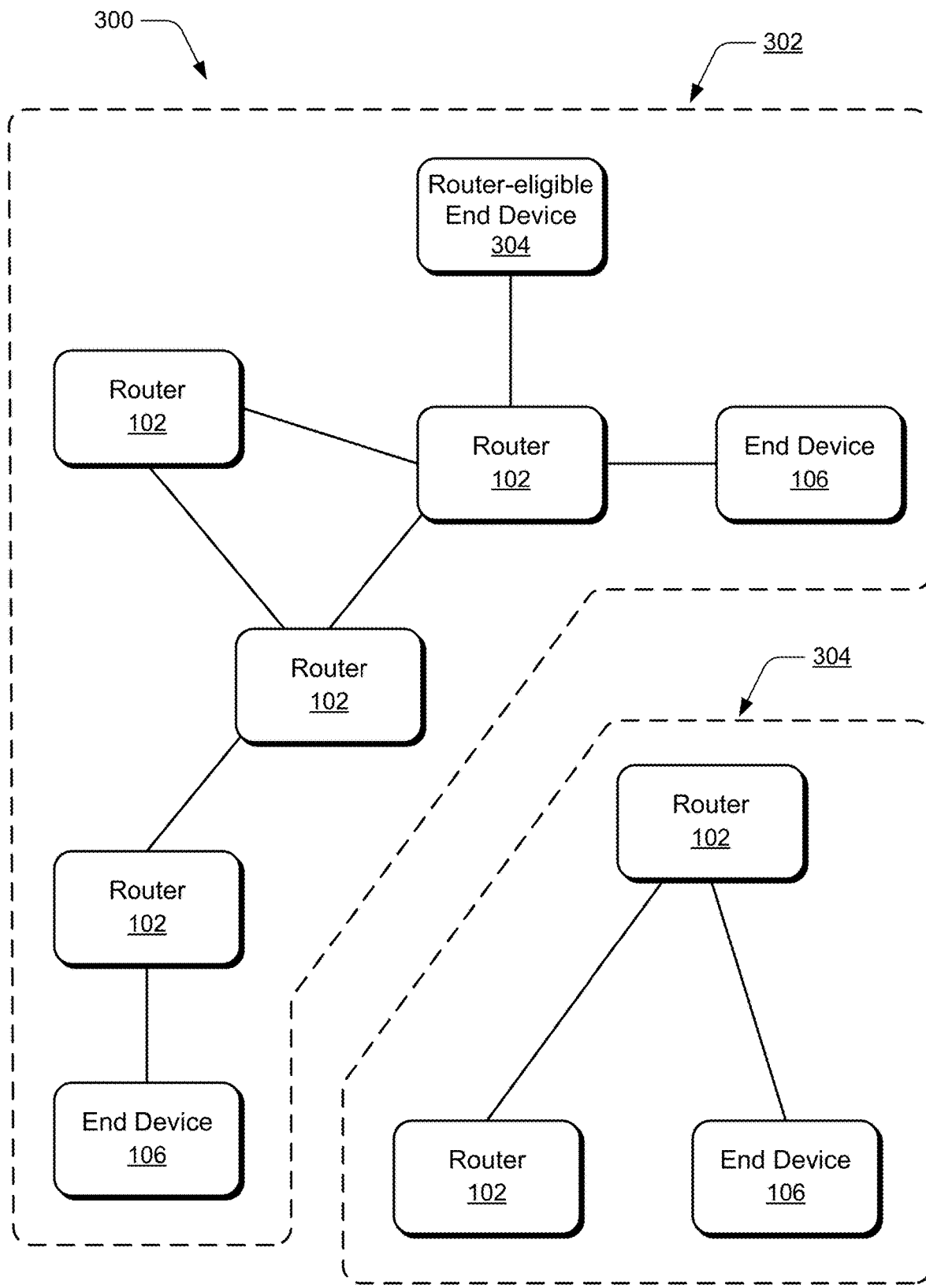
FIG. 3 illustrates an example of partitioning a mesh network in accordance with embodiments of distributed coordination of mesh network configuration updates.

FIG. 3 illustrates the mesh network 100 when a split or partitioning of the mesh network 100 has occurred. For instance, one of the routers 102 may have lost power, resulting in a split of the mesh network 100 that prevents one partition or fragment of the mesh network 100 from communicating with another partition. On the other hand, radio interference may have blocked communications in a portion of the mesh network 100 creating the split of the mesh network 100. When the mesh network 100 splits into two network fragments 302 and 304, the network fragment 304 will choose a leader for the fragment 304, and may also accept a commissioner for the fragment 304, which can be the same or different than the commissioner for the fragment 302. Either, or both, of the fragments may update commissioning datasets during the split.

The mesh network 100 can cleanly and reliably partition into two disparate fragments, which are fully functional networks when connectivity between the two partitions is severed. The partitions can continue any outstanding communications that are fully contained within a partition uninterrupted and can continue with normal key rotation. The two mesh network partitions, formerly part of the single, mesh network 100 can autonomously merge when connectivity between the two partitions is restored.

If the commissioning dataset is changed in the network fragment 302 during the split, the commissioning credential change will be propagated to the devices within the network fragment 304 when connectivity is restored between the network fragments 302 and 304. In other words, in some embodiments, the commissioning credential is updated to the most recently adopted credential. However, if both network fragments 302 and 304 authorize different commissioners, and receive new and different commissioning credentials during the split, it may be more difficult to determine the most recent credential.

Resolution of commissioning credentials between any two mesh network fragments, previously fragmented but now merging, propagates the most recently changed commissioning dataset to the devices in the mesh network 100. If there is a change on the fragment 302, the user believes he or she is changing the commissioning dataset on the entire mesh network 100 but, due to the partitioning, is only effectively changing the credential on the fragment 302. At some later point in time, the fragments 302 and 304 merge. Because the original commissioning dataset on the fragment 304 remained unchanged following the fragmentation, whereas the commissioning dataset on the fragment 302 was changed, the merged fragments assume the new commissioning dataset established on the fragment 302 during the fragmentation. If there is a change to the commissioning dataset on the fragment 304 during the split, the change made on the fragment 304, is propagated to the devices in the fragment 302 after the merge.

In the case where, two users change the commissioning dataset on the respective two fragments 302 and 304 during the split, the two users each believe they are changing the commissioning dataset on the entire mesh network 100. However, because the mesh network 100 is fragmented, both users are able to establish themselves as the network commissioner and change the commissioning dataset on their respective network fragments. At some later point in time, the fragments 302 and 304 merge, but it may not be known which leader, from the two fragments, will prevail as the leader for the merged mesh network. The leader that prevails may not have a copy of the most recently changed commissioning dataset. Since the commissioning dataset was changed independently on the two fragments, the fragment with the most recently updated commissioning dataset takes precedence.

To determine which network credential of the two is the most recent, the commissioning dataset includes an active timestamp, as well as the commissioning credential to resolve differences between the commissioning credentials when the mesh network merges. The active timestamp information enables nodes in the mesh network 100 to determine the most recent update to the commissioning credentials in any fragment, and synchronize the commissioning dataset in the devices in the mesh network 100 to the most recently updated commissioning credentials.

To ensure an orderly transition of the mesh network to operation using updates to the commissioning dataset, the leader 216 propagates two commissioning datasets, an active commissioning dataset, and a pending commissioning dataset. The active commissioning dataset includes the parameter values that are currently used by devices in the mesh network 100. The active commissioning dataset includes an active timestamp that is the time value assigned to the active commissioning dataset and is used for comparing between multiple, different active commissioning datasets to determine which active commissioning dataset is the most recent and thus takes priority over all others.

The active commissioning dataset also includes a number of parameters that a mesh network device uses to operate on the mesh network 100. For example, the active commissioning dataset may include a list of type-length-value (TLV) fields that encode these parameters. By way of example, and not limitation, the active commissioning dataset includes a channel, a channel mask, an extended Personal Area Network (PAN) identifier (ID), a mesh-local prefix, a network master key, a network name, a PAN ID, a pre-shared key for the commissioner (PSKc), and a security policy. The channel is a physical (PHY) layer channel that the mesh network 100 uses for data transmissions. The channel mask is the set of physical layer channels that devices use when performing an active scan. The extended PAN ID is used to identify the mesh network 100. The mesh-local prefix is used for addressing and routing communication by devices in the same mesh network 100. The network master key is used to derive security material for Media Access Control (MAC) layer and Mesh Link Establishment (MLE) message protection. The network name is a human-readable string that identifies the mesh network 100.

The PAN ID is a MAC-layer PAN ID that the mesh network 100 uses for communication. The PSKc is derived from a commissioning credential passphrase that a commissioner needs to connect to and authenticate with the mesh network 100. The security policy specifies network administrator preferences for which security-related operations are allowed or disallowed in the mesh network 100.

The active commissioning dataset includes parameter values that affect the ability for neighboring devices to communicate. Updates for these parameters are communicated to the mesh network 100 in the pending commissioning dataset, and are scheduled to be used by the mesh network 100 at a time in the future. The pending commissioning dataset includes a delay timer and a pending timestamp. The delay timer is a parameter that indicates the time remaining until mesh network devices are to adopt the parameter values from the pending commissioning dataset for the corresponding parameters in the active commissioning dataset. The pending timestamp is a time value assigned to the pending commissioning dataset and is used for comparing multiple different pending commissioning datasets to determine which pending commissioning dataset is the most recent and thus takes priority over all others. The pending commissioning dataset also includes any of the parameters of the active commissioning dataset. As an example, and not a limitation, the pending commissioning dataset includes the channel, the mesh-local prefix, the network master key, and the Personal Area Network Identifier (PAN ID).

The delay timer is set to a time value which is long enough to ensure that sleepy child end devices 106 will wake up and retrieve the pending commissioning dataset before the expiration of the delay timer. As an example, and not a limitation, the delay timer is a count-down timer in a mesh network device that can be implemented in any suitable manner. To ensure that the delay timer is set to an appropriate value, limits may be used to prevent setting the delay timer to a value of a time that is too short to ensure that all devices receive the pending commissioning dataset before the expiration of the delay time. For example, the commissioner may set this value based on knowledge of the devices and configurations in the mesh network 100. Alternatively, the leader 216 may query the routers 102 in the mesh network 100 to determine how frequently child end devices 106 wake up to retrieve data packets from their respective parent router 102. Based on receiving this wake-up interval information for the child end devices 106 from the routers 102, the leader 216 sets a minimum value for the delay timer that is equal to or greater than the longest reported wake-up interval to ensure that all devices in the mesh network 100 will receive the pending commissioning dataset before the expiration of the delay timer.

As each router 102 forwards the pending commissioning dataset across the mesh network 100, each router 102 adjusts the delay time value to account for any time taken by the router 102 to process and forward the pending commissioning dataset. This ensures that all devices in the mesh network 100 will transition to the parameter values in the pending commissioning dataset at approximately the same time.

When the delay timer running in each mesh network device expires (i.e., reaches zero), each mesh network device updates the active commissioning dataset with the values from the pending commissioning dataset. The devices in the mesh network 100 then continue to securely communicate, using the newly updated values in the active commissioning dataset. Since each device in the mesh network switches at approximately the same time, communication is uninterrupted in the mesh network 100.

Figure 4:
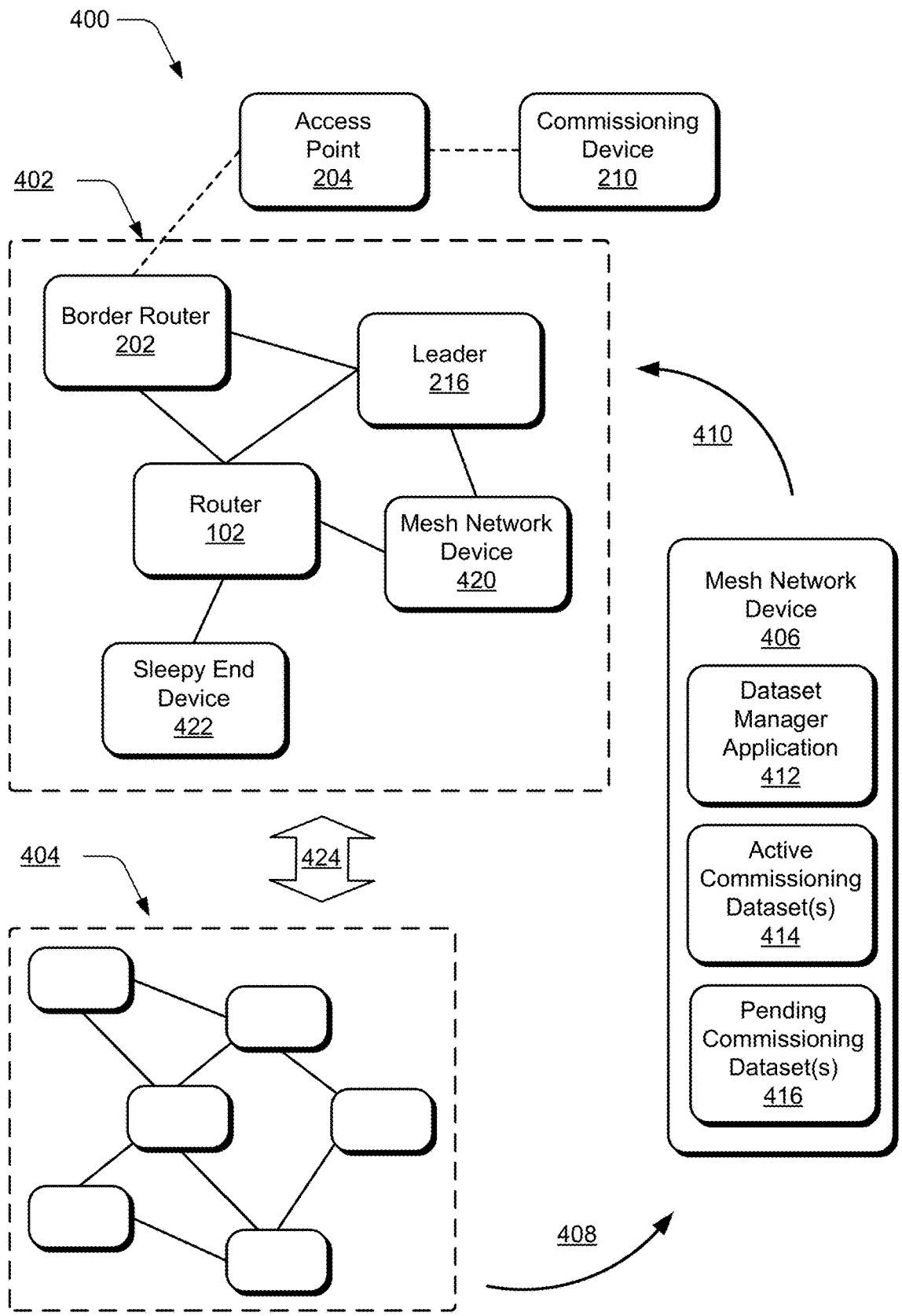
FIG. 4 illustrates an example of managing pending commissioning datasets over mesh network partitions in accordance with embodiments of distributed coordination of mesh network configuration updates.

FIG. 4 illustrates the management of pending commissioning datasets when a split or partitioning of the mesh network 100 has occurred. The mesh network 100 is illustrated as split into two partitions 402 and 404. A mesh network device 406 is shown detaching at 408 from the partition 404. At 410, the mesh network device 406 joins the partition 402. A dataset manager application 412 in the mesh network device 406 retrieves the active commissioning dataset 414 and the pending commissioning dataset 416 for the partition 402 from the leader 216 in the partition 402. The mesh network device 406 uses the active commissioning dataset 414 retrieved from the leader 216 in order to participate in the partition 402.

After the mesh network device 406 joins the partition 402, the dataset manager application 412 determines whether the active commissioning dataset 414, received from the leader 216, has a different active timestamp than a local copy of an active commissioning dataset 414 that was stored by the mesh network device 406 before it joined the partition 402. If the dataset manager application 412 determines that the stored active commissioning dataset 414 is newer than the one the partition 402 is using, the mesh network device 406 communicates the newer active commissioning dataset 414 to the leader 216 of the partition 402, while still using the active commissioning dataset 414 that was retrieved from the leader 216 to communicate on the partition 402. If the dataset manager application 412 determines that the local copy of the active commissioning dataset 414 is older than the active commissioning dataset 414 retrieved from the leader 216, the mesh network device 406 discards the older active commissioning dataset 414.

The mesh network device 406 may also have persisted a pending commissioning dataset 416 before joining the partition 402, which includes a delay timer as described above. If the mesh network device 406 is not attached to a mesh network partition, the mesh network device 406 maintains the delay timer in the pending commissioning dataset 416. When the delay timer expires, the dataset manager application 412 in the mesh network device 406 applies the values in the pending commissioning dataset 416 to the active commissioning dataset 414. If the mesh network device 406 is not joined to a mesh network partition when the delay timer expires, it is assumed that other mesh network devices may also be switching from pending to active commissioning datasets, and the mesh network device 406 will be configured to rejoin a mesh network partition if it is using the updated active commissioning dataset as well.

If the dataset manager application 412 determines that the mesh network device 406 has a delay timer that is running when it joins the partition 402, the mesh network device 406 synchronizes its pending commissioning dataset 416 with the partition 402. If the value of pending timestamp, received in the pending commissioning dataset 416 for the partition 402, is equal to or greater than a local pending timestamp in the mesh network device 406, the dataset manager application 412 requests the pending commissioning dataset 416 from a neighbor device, such as mesh network device 420, in the partition 402, persists the pending commissioning dataset received from the neighbor device, and updates the delay timer in the mesh network device 406 with the received delay time value from the neighbor device.

If the pending commissioning dataset 416 in the partition 402 includes a pending timestamp value that is less than the value of the pending timestamp stored in the mesh network device 406, the mesh network device 406 sends its pending commissioning dataset 416 to the leader 216 to update the pending commissioning dataset 416 for the partition 402. If the leader 216 determines that the delay timer in the received pending commissioning dataset 416 is below a minimum delay time, the leader 216 will increase the value of the delay timer to the minimum delay time before propagating the received commissioning dataset 416 to the partition 402. Enforcing a minimum delay time guarantees that sleeping mesh network devices will receive the new pending commissioning dataset 416 before the time at which the mesh network devices commit the values in the pending commissioning dataset 416 to their active commissioning datasets 414. For example, the leader 216 may set the delay timer value to a value based on querying the routers 102, as described above, to assure that a sleepy end device 422 will retrieve the pending commissioning dataset 416 before it is time to adopt it.

In the event that the mesh network device 406 is in the process of joining the partition 402, when the delay timer in the pending commissioning dataset 416 is close to zero or expires, the mesh network device 406 adopts the pending commissioning dataset 416 only if it has completed joining the partition 402. If the time delay expires before the mesh network device 406 has fully joined the partition 402, the mesh network device 406 does not adopt the values in the pending commissioning dataset 416 and maintains its active commissioning dataset 414.

Partitions that are formed when the mesh network 100 splits or partitions, as described above and shown at 424, use the same mechanisms as described with respect to the mesh network device 406 moving between the partition 404 and the partition 402. As a part of the merge, the mesh network 100 decides on a single mesh network device to be the leader 216 of the merged mesh network 100. When the leader 216 is selected, the leader 216 propagates its copies of the active commissioning dataset 414 and the pending commissioning dataset 416. Each device in the merged mesh network 100 processes the active commissioning dataset 414 and the pending commissioning dataset 416 received from the leader 216, as described with respect to mesh network device 406 above, which results in the merged mesh network 100 operating with the most recent active commissioning dataset 414 and the most recent pending commissioning dataset 416.

Example methods 500 through 700 are described with reference to respective FIGS. 5-7 in accordance with one or more embodiments of the distributed coordination of mesh network configuration updates. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
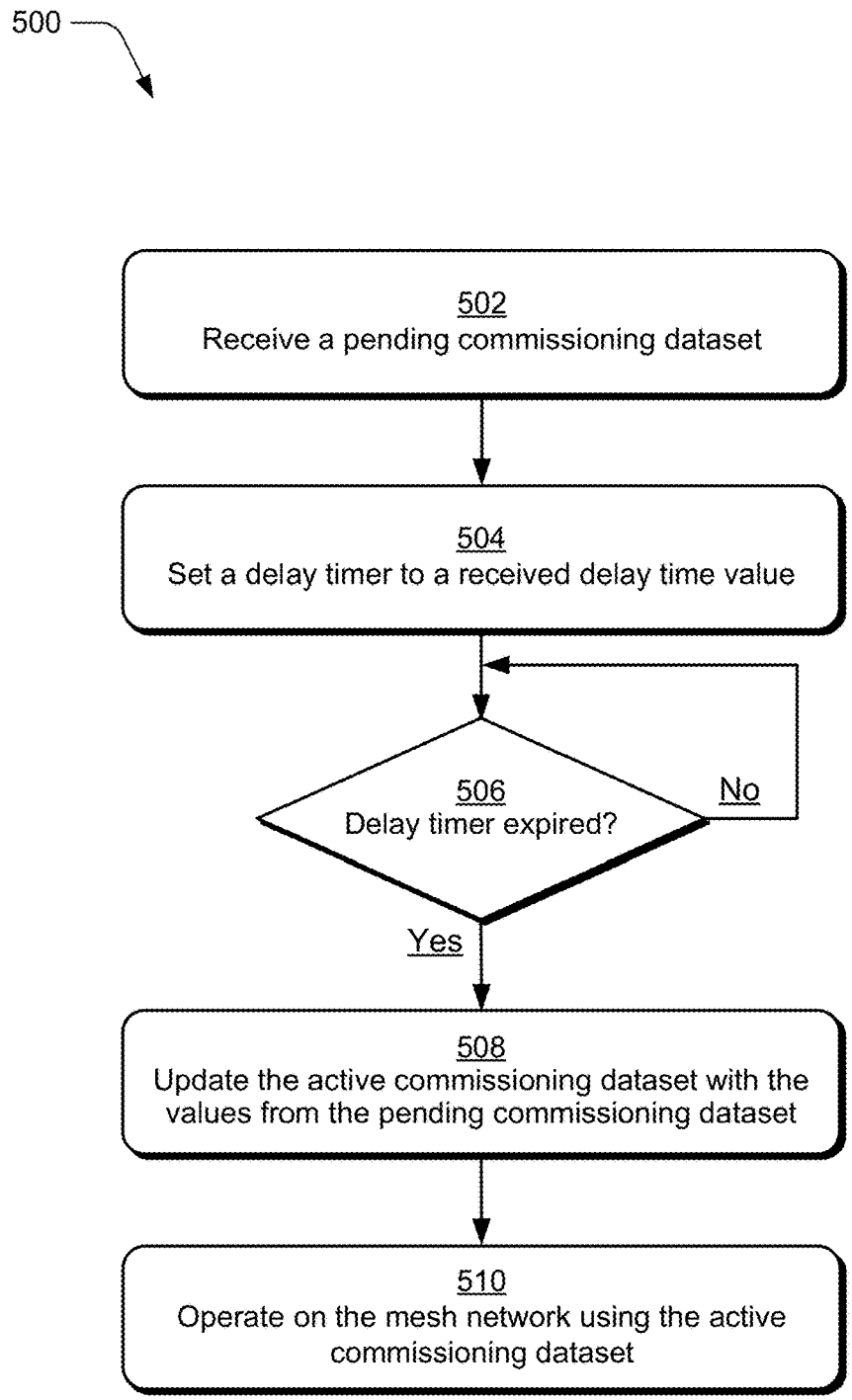
FIG. 5 illustrates an example method of distributed coordination of mesh network configuration updates as generally related to managing commissioning datasets across the mesh network in accordance with embodiments of the techniques described herein.

FIG. 5 illustrates example method(s) 500 of the distributed coordination of mesh network configuration updates as generally related to managing commissioning datasets across the mesh network. The order in which the method blocks are described are not intended to be construed as a limitation, and any number of the described method blocks can be combined in any order to implement a method, or an alternate method.

At block 502, a mesh network device receives a pending commissioning dataset. For example, a mesh network device 420 receives a pending commissioning dataset 416 from the leader 216 over the mesh network 100, and the pending commissioning dataset 416 includes parameters for communication on the mesh network 100.

At block 504, the mesh network device sets a delay timer to a received delay timer value. For example, the mesh network device 420 initializes the value of a delay timer with a delay time value included in the received pending commissioning dataset 416.

At block 506, a determination is made as to whether the delay timer has expired. For example, the mesh network device 420 periodically evaluates a current value of the delay timer to determine if the delay timer has expired. If the delay timer has not expired (i.e., "No" from 506) the mesh network device 420 continues to periodically evaluate the delay timer value. Alternatively, the mesh network device 420 may determine the delay timer has expired based on receiving an interrupt from the timer, or has not expired based on not receiving the timer interrupt.

At block 508, the mesh network device updates parameters in its local copy of the active commissioning dataset with the corresponding values in the pending commissioning dataset. For example, if the mesh network device 420 determines that the delay timer has expired (i.e., "Yes" from 506), the mesh network device 420 updates parameters of the active commissioning dataset 414 in the mesh network device 420 with the corresponding values from the pending commissioning dataset 416.

At block 510, the mesh network device operates on the mesh network using the active commissioning dataset. For example, the mesh network device 420 communicates with other mesh network devices in the mesh network 100 using the updated active commissioning dataset 414.

Figure 6:
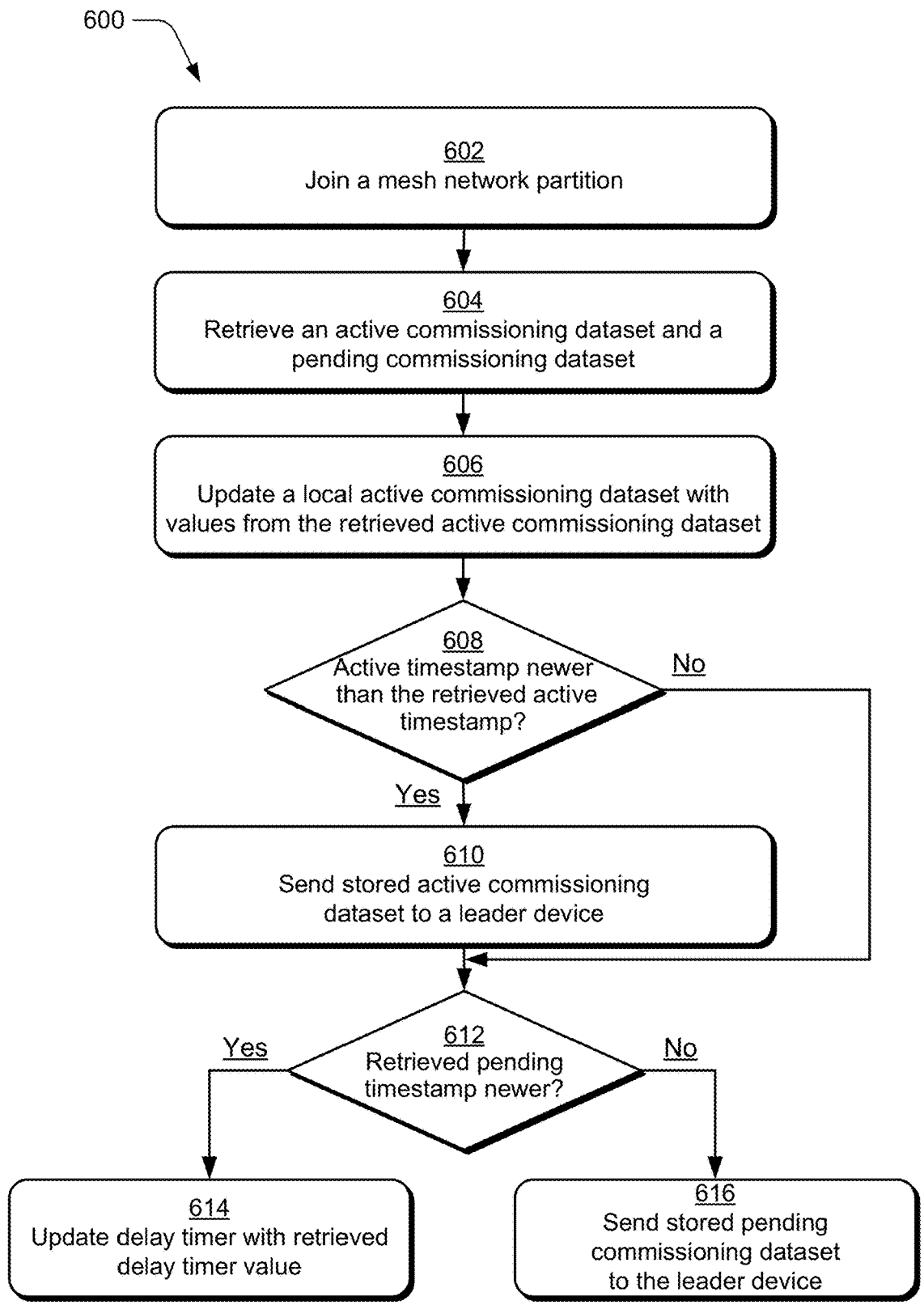
FIG. 6 illustrates another example method of distributed coordination of mesh network configuration updates as generally related to managing commissioning datasets across the mesh network in accordance with embodiments of the techniques described herein.

FIG. 6 illustrates example method(s) 600 of the distributed coordination of mesh network configuration updates as generally related to managing commissioning datasets across the mesh network. The order in which the method blocks are described are not intended to be construed as a limitation, and any number of the described method blocks can be combined in any order to implement a method, or an alternate method.

At block 602, a mesh network device joins a mesh network partition. For example, the mesh network device 406 joins the partition 402 of the mesh network that has been partitioned into the two partitions 402 and 404.

At block 604, the mesh network device retrieves an active commissioning dataset and a pending commissioning dataset for the mesh network partition. For example, the mesh network device 406 retrieves the active commissioning dataset and the pending commissioning dataset from the leader 216 of the partition 402.

At block 606, the mesh network device updates a local active commissioning dataset with values from the retrieved active commissioning dataset. For example, the mesh network device 406 updates a local active commissioning dataset that is stored in the mesh network device 406 with values from the retrieved active commissioning dataset, so that the mesh network device 406 can operate on the partition 402.

At block 608, the mesh network device compares an active timestamp, included in the retrieved active commissioning dataset, to the active timestamp, included in the active commissioning dataset stored in the mesh network device, which was in use before the update, to determine if the active timestamp in the active commissioning dataset is newer than the retrieved active timestamp. For example, the mesh network device 406 compares an active timestamp included in the retrieved active commissioning dataset 414 to the active timestamp from the active commissioning dataset 414 stored in the mesh network device 406, which was in use before the update, to determine if the active timestamp in the active commissioning dataset is newer than the active timestamp in the retrieved active commissioning dataset.

At block 610, in response to determining that the active commissioning dataset stored in the mesh network device is newer (i.e., "Yes" from 608), the mesh network device sends the stored copy of the active commissioning dataset to the leader of the mesh network. For example, the mesh network device 406 transmits the active commissioning dataset 414, stored in the mesh network device 406, to the leader device 216, causing the leader device 216 to compare the received active timestamp to the active timestamp in the active commissioning dataset 414 stored in the leader device 216 to determine the most recent active commissioning dataset 414.

At block 612, the mesh network device compares a pending timestamp, included in the retrieved pending commissioning dataset, to the pending timestamp, included in the pending commissioning dataset stored in the mesh network device, to determine if the retrieved pending timestamp is newer than the pending timestamp in the stored commissioning dataset. For example, the mesh network device 406 compares the value of the pending timestamp, included in the pending commissioning dataset 416 retrieved from the leader 216 of the mesh network partition 402, to the pending timestamp from the pending commissioning dataset 416, stored in the mesh network device 406, to determine if the retrieved pending timestamp value is newer. The method also transitions to block 612, if the active timestamp from the active commissioning dataset stored in the mesh network device is not newer (i.e., "No" from 608.)

At block 614, in response to determining the retrieved pending timestamp is newer (i.e., "Yes" from 612) the mesh network device updates the delay timer with the retrieved delay timer value. For example, based on determining the retrieved pending timestamp value being newer, the mesh network device 406 sets the delay timer to the retrieved delay timer value for the mesh network partition 402.

At block 616, in response to determining the retrieved pending timestamp value is not newer (i.e., "No" from 612) the mesh network device sends a copy of the pending commissioning dataset stored in the mesh network device to the leader. For example, based on determining the retrieved pending timestamp value is not newer, the mesh network device 406 transmits a copy of the pending commissioning dataset 416, stored in the mesh network device 406, to the leader 216, causing the leader 216 to compare the pending timestamp in the transmitted pending commissioner dataset 416 to a pending timestamp stored in the leader 216.

Figure 7:
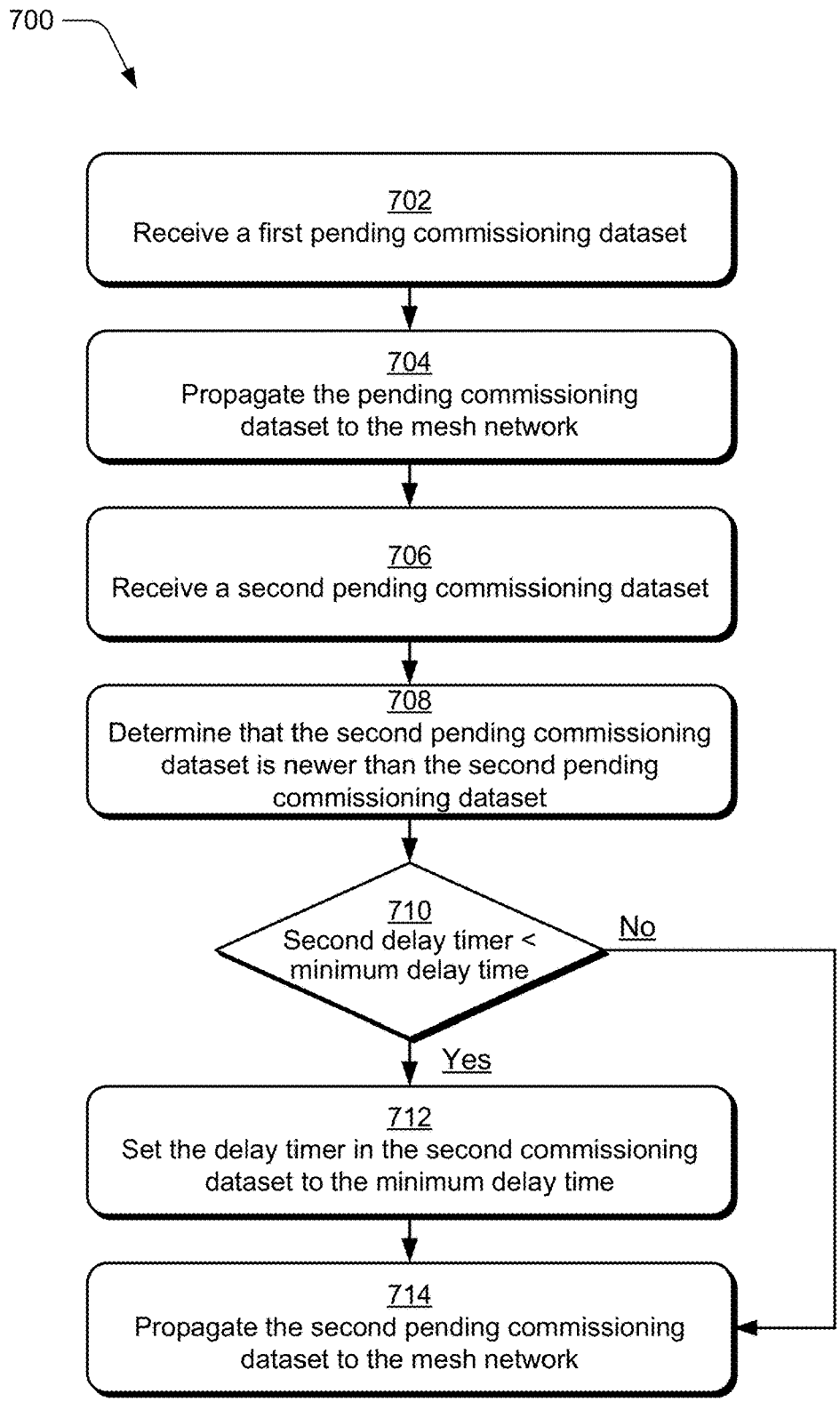
FIG. 7 illustrates another example method of distributed coordination of mesh network configuration updates as generally related to managing commissioning datasets across the mesh network in accordance with embodiments of the techniques described herein.

FIG. 7 illustrates example method(s) 700 of the distributed coordination of mesh network configuration updates as generally related to managing commissioning datasets across the mesh network. The order in which the method blocks are described are not intended to be construed as a limitation, and any number of the described method blocks can be combined in any order to implement a method, or an alternate method.

At block 702, a leader receives a first pending commissioning dataset. For example, the leader device 216 receives a pending commissioning dataset 416 from the commissioning device 210.

At block 704, the leader propagates the received pending commissioning dataset to the mesh network. For example, the leader device 216 stores a copy of the pending commissioning dataset 416 in its memory and transmits the pending commissioning dataset 416 across the mesh network 100.

At block 706, the leader receives a second pending commissioning dataset. For example, the leader device 216 receives a pending commissioning dataset 416 from the mesh network device 406 that is joining the mesh network partition 402.

At block 708, the leader compares a pending timestamp received in the second pending commissioning dataset, to the pending timestamp in the first pending commissioning dataset, to determine that the second pending commissioning dataset is newer than the first pending commissioning dataset. For example, the leader device 216 compares the value of the pending timestamp included in the second pending commissioning dataset 416, received from the mesh network device 406, to the value of the pending timestamp in the first pending commissioning dataset 416 to determine that the second pending commissioning dataset 416 is newer, otherwise the second pending commissioning dataset 416 is discarded by the leader device 216 and the method terminates.

At block 710, the leader compares the value of the delay timer received in the second pending commissioning dataset to a minimum delay time to determine if the value of the received delay timer is less than the minimum delay time. If the value of the received delay timer is not less than the minimum delay time (i.e., "No" from 710) the process continues at block 714. For example, the leader device 216 compares the value of the delay timer received in the second pending commissioning dataset 416 from the mesh network device 406 to a minimum delay time to determine if the value of the received delay timer is less than the minimum delay time.

At block 712, in response to determining that the value of the delay timer is less than the minimum delay time (i.e., "Yes" from 710), the leader sets the to the minimum delay value. For example, the leader device 216 set the value of the delay timer to the minimum delay time.

At block 714, the leader propagates the received pending commissioning dataset to the mesh network. For example, the leader device 216 stores a copy of the received pending commissioning dataset 416 in its memory and transmits the received pending commissioning dataset 416 across the mesh network 100.

Figure 8:
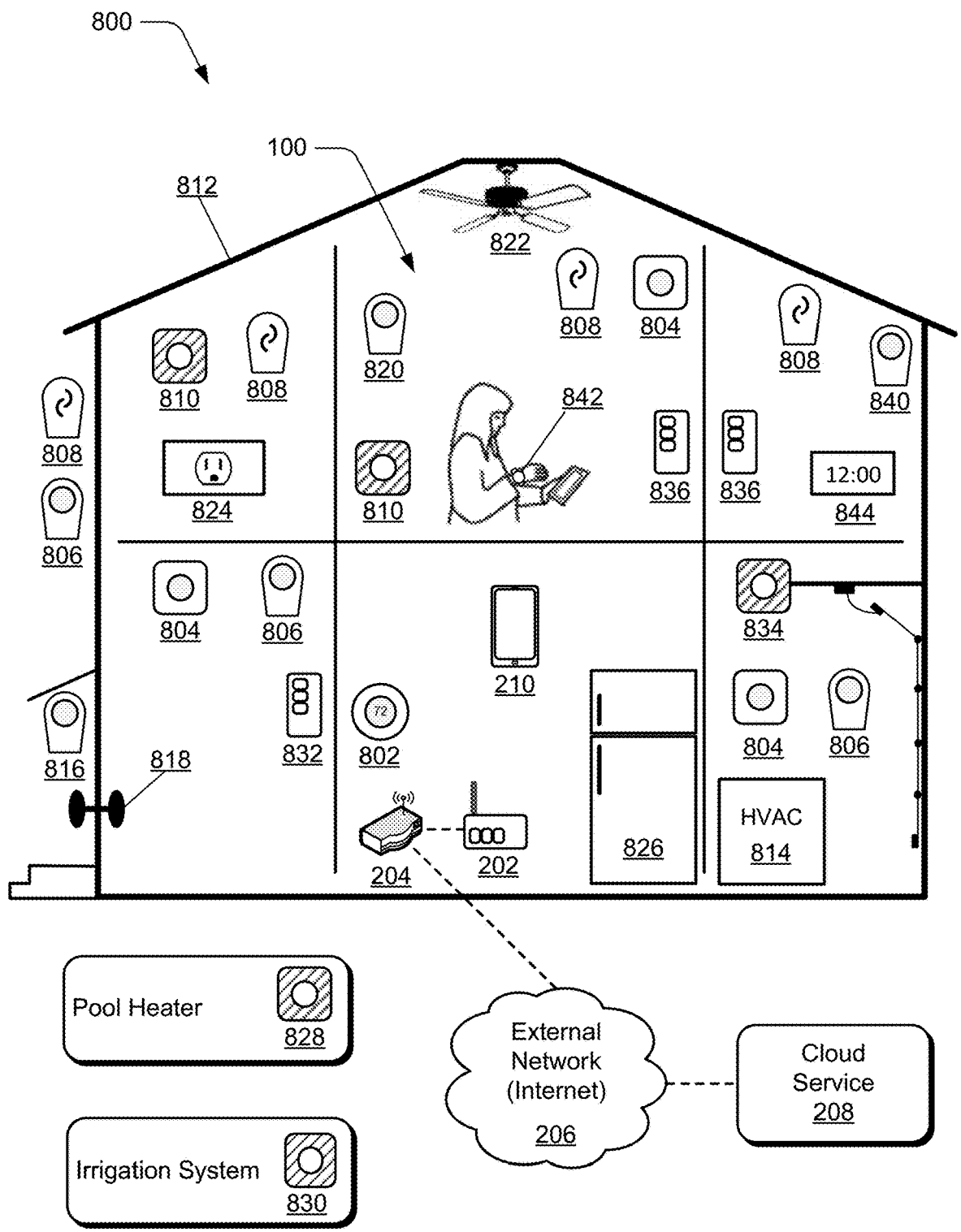
FIG. 8 illustrates an example environment in which a mesh network can be implemented in accordance with embodiments of the techniques described herein.

FIG. 8 illustrates an example environment 800 in which the mesh network 100 (as described with reference to FIG. 1), and embodiments of distributed coordination of mesh network configuration updates can be implemented. Generally, the environment 800 includes the mesh network 100 implemented as part of a smart-home or other type of structure with any number of mesh network devices that are configured for communication in a mesh network. For example, the mesh network devices can include a thermostat 802, hazard detectors 804 (e.g., for smoke and/or carbon monoxide), cameras 806 (e.g., indoor and outdoor), lighting units 808 (e.g., indoor and outdoor), and any other types of mesh network devices 810 that are implemented inside and/or outside of a structure 812 (e.g., in a smart-home environment). In this example, the mesh network devices can also include any of the previously described devices, such as a border router 202, a leader device 216, a commissioning device 210, as well as any of the devices implemented as a router 102, and/or an end device 106.

In the environment 800, any number of the mesh network devices can be implemented for wireless interconnection to wirelessly communicate and interact with each other. The mesh network devices are modular, intelligent, multi-sensing, network-connected devices that can integrate seamlessly with each other and/or with a central server or a cloud-computing system to provide any of a variety of useful smart-home objectives and implementations. An example of a mesh network device that can be implemented as any of the devices described herein is shown and described with reference to FIG. 9.

In implementations, the thermostat 802 may include a Nest® Learning Thermostat that detects ambient climate characteristics (e.g., temperature and/or humidity) and controls a HVAC system 814 in the smart-home environment. The learning thermostat 802 and other smart devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 804 can be implemented to detect the presence of a hazardous substance or a substance indicative of a hazardous substance (e.g., smoke, fire, or carbon monoxide). In examples of wireless interconnection, a hazard detector 804 may detect the presence of smoke, indicating a fire in the structure, in which case the hazard detector that first detects the smoke can broadcast a low-power wake-up signal to all of the connected mesh network devices. The other hazard detectors 804 can then receive the broadcast wake-up signal and initiate a high-power state for hazard detection and to receive wireless communications of alert messages. Further, the lighting units 808 can receive the broadcast wake-up signal and activate in the region of the detected hazard to illuminate and identify the problem area. In another example, the lighting units 808 may activate in one illumination color to indicate a problem area or region in the structure, such as for a detected fire or break-in, and activate in a different illumination color to indicate safe regions and/or escape routes out of the structure.

In various configurations, the mesh network devices 810 can include an entryway interface device 816 that functions in coordination with a network-connected door lock system 818, and that detects and responds to a person's approach to or departure from a location, such as an outer door of the structure 812. The entryway interface device 816 can interact with the other mesh network devices based on whether someone has approached or entered the smart-home environment. An entryway interface device 816 can control doorbell functionality, announce the approach or departure of a person via audio or visual means, and control settings on a security system, such as to activate or deactivate the security system when occupants come and go. The mesh network devices 810 can also include other sensors and detectors, such as to detect ambient lighting conditions, detect room-occupancy states (e.g., with an occupancy sensor 820), and control a power and/or dim state of one or more lights. In some instances, the sensors and/or detectors may also control a power state or speed of a fan, such as a ceiling fan 822. Further, the sensors and/or detectors may detect occupancy in a room or enclosure, and control the supply of power to electrical outlets or devices 824, such as if a room or the structure is unoccupied.

The mesh network devices 810 may also include connected appliances and/or controlled systems 826, such as refrigerators, stoves and ovens, washers, dryers, air conditioners, pool heaters 828, irrigation systems 830, security systems 832, and so forth, as well as other electronic and computing devices, such as televisions, entertainment systems, computers, intercom systems, garage-door openers 834, ceiling fans 822, control panels 836, and the like. When plugged in, an appliance, device, or system can announce itself to the mesh network as described above, and can be automatically integrated with the controls and devices of the mesh network, such as in the smart-home. It should be noted that the mesh network devices 810 may include devices physically located outside of the structure, but within wireless communication range, such as a device controlling a swimming pool heater 828 or an irrigation system 830.

As described above, the mesh network 100 includes a border router 202 that interfaces for communication with an external network, outside the mesh network 100. The border router 202 connects to an access point 204, which connects to the communication network 206, such as the Internet. A cloud service 208, which is connected via the communication network 206, provides services related to and/or using the devices within the mesh network 100. By way of example, the cloud service 208 can include applications for the commissioning device 210, such as smart phones, tablets, and the like, to devices in the mesh network, processing and presenting data acquired in the mesh network 100 to end users, linking devices in one or more mesh networks 100 to user accounts of the cloud service 208, provisioning and updating devices in the mesh network 100, and so forth. For example, a user can control the thermostat 802 and other mesh network devices in the smart-home environment using a network-connected computer or portable device, such as a mobile phone or tablet device. Further, the mesh network devices can communicate information to any central server or cloud-computing system via the border router 202 and the access point 204. The data communications can be carried out using any of a variety of custom or standard wireless protocols (e.g., Wi-Fi, ZigBee for low power, 6LoWPAN, etc.) and/or by using any of a variety of custom or standard wired protocols (CAT6 Ethernet, HomePlug, etc.).

Any of the mesh network devices in the mesh network 100 can serve as low-power and communication nodes to create the mesh network 100 in the smart-home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the mesh network. The mesh network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor 840 detects that the room is dark and when the occupancy sensor 820 detects that someone is in the room. Further, the sensor can include a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment as well as over the Internet to a central server or cloud-computing system.

In other configurations, various ones of the mesh network devices can function as "tripwires" for an alarm system in the smart-home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the mesh network. In other implementations, the mesh network can be used to automatically turn on and off the lighting units 808 as a person transitions from room to room in the structure. For example, the mesh network devices can detect the person's movement through the structure and communicate corresponding messages via the nodes of the mesh network. Using the messages that indicate which rooms are occupied, other mesh network devices that receive the messages can activate and/or deactivate accordingly. As referred to above, the mesh network can also be utilized to provide exit lighting in the event of an emergency, such as by turning on the appropriate lighting units 808 that lead to a safe exit. The light units 808 may also be turned-on to indicate the direction along an exit route that a person should travel to safely exit the structure.

The various mesh network devices may also be implemented to integrate and communicate with wearable computing devices 842, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other mesh network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the mesh network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the mesh network, conforming to the wireless interconnection protocols for communicating on the mesh network.

The mesh network devices 810 may also include a smart alarm clock 844 for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the mesh network based on a unique signature of the person, which is determined based on data obtained from sensors located in the mesh network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 802 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other mesh network devices can use the data to provide other smart-home objectives, such as adjusting the thermostat 802 so as to pre-heat or cool the environment to a desired setting, and turning-on or turning-off the lights 808.

In implementations, the mesh network devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home, and is also referred to as "audio fingerprinting water usage." Similarly, the mesh network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

Figure 9:
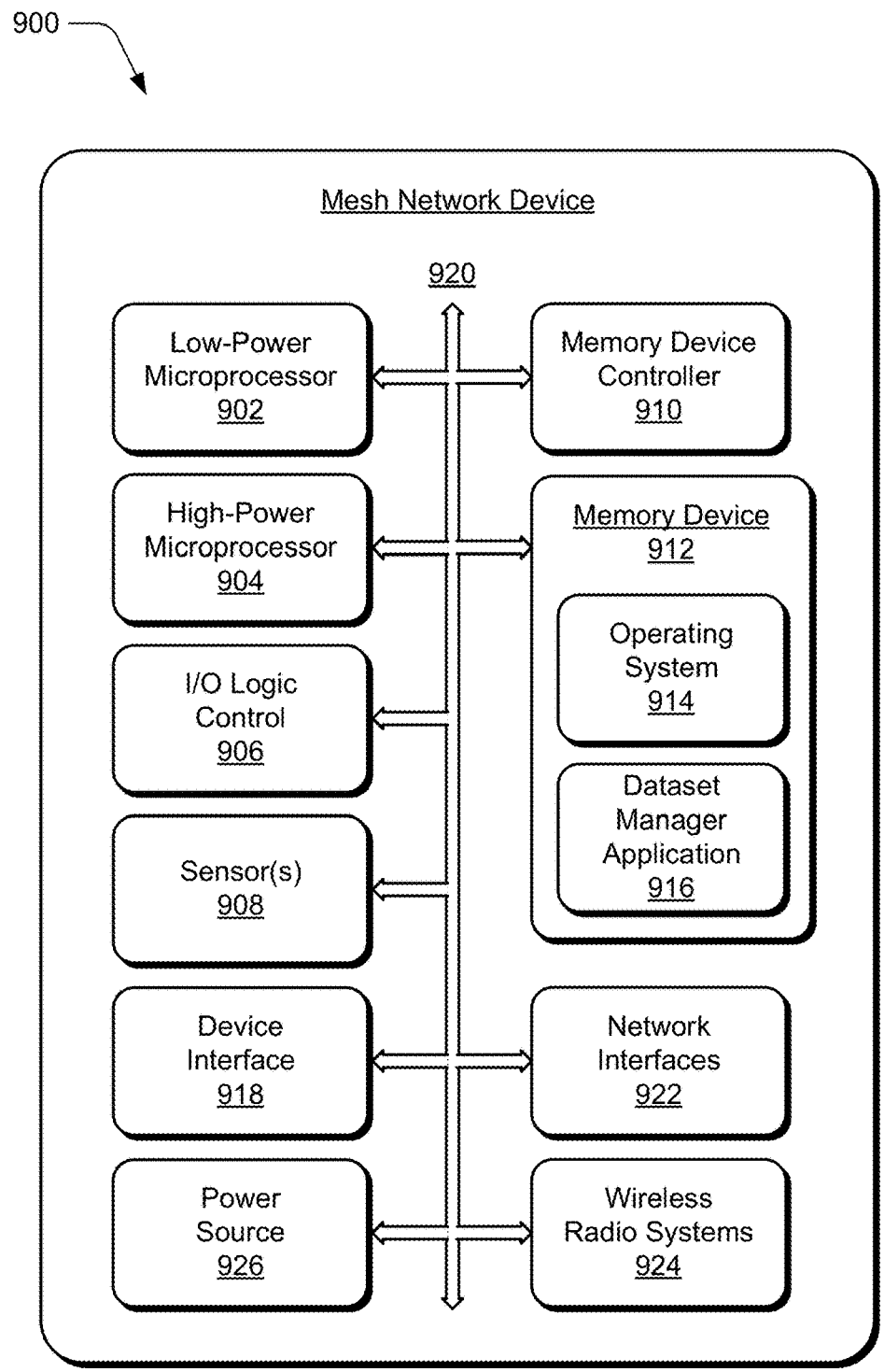
FIG. 9 illustrates an example mesh network device that can be implemented in a mesh network environment in accordance with one or more embodiments of the techniques described herein.

FIG. 9 illustrates an example mesh network device 900 that can be implemented as any of the mesh network devices in a mesh network in accordance with one or more embodiments of distributed coordination of mesh network configuration updates as described herein. The device 900 can be integrated with electronic circuitry, microprocessors, memory, input output (I/O) logic control, communication interfaces and components, as well as other hardware, firmware, and/or software to implement the device in a mesh network. Further, the mesh network device 900 can be implemented with various components, such as with any number and combination of different components as further described with reference to the example device shown in FIG. 9.

In this example, the mesh network device 900 includes a low-power microprocessor 902 and a high-power microprocessor 904 (e.g., microcontrollers or digital signal processors) that process executable instructions. The device also includes an input-output (I/O) logic control 906 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 902 and the high-power microprocessor 904 can also support one or more different device functionalities of the device. For example, the high-power microprocessor 904 may execute computationally intensive operations, whereas the low-power microprocessor 902 may manage less complex processes such as detecting a hazard or temperature from one or more sensors 908. The low-power processor 902 may also wake or initialize the high-power processor 904 for computationally intensive processes.

The one or more sensors 908 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 908 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the mesh network device 900 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The mesh network device 900 includes a memory device controller 910 and a memory device 912, such as any type of a nonvolatile memory and/or other suitable electronic data storage device. The mesh network device 900 can also include various firmware and/or software, such as an operating system 914 that is maintained as computer executable instructions by the memory and executed by a microprocessor. The device software may also include a dataset manager application 916 that implements embodiments of distributed coordination of mesh network configuration updates. The mesh network device 900 also includes a device interface 918 to interface with another device or peripheral component, and includes an integrated data bus 920 that couples the various components of the mesh network device for data communication between the components. The data bus in the mesh network device may also be implemented as any one or a combination of different bus structures and/or bus architectures.

The device interface 918 may receive input from a user and/or provide information to the user (e.g., as a user interface), and a received input can be used to determine a setting. The device interface 918 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 918 may also receive inputs from any number of peripherals, such as buttons, a keypad, a switch, a microphone, and an imager (e.g., a camera device).

The mesh network device 900 can include network interfaces 922, such as a mesh network interface for communication with other mesh network devices in a mesh network, and an external network interface for network communication, such as via the Internet. The mesh network device 900 also includes wireless radio systems 924 for wireless communication with other mesh network devices via the mesh network interface and for multiple, different wireless communications systems. The wireless radio systems 924 may include Wi-Fi, Bluetooth™, Mobile Broadband, and/or point-to-point IEEE 802.15.4. Each of the different radio systems can include a radio device, antenna, and chipset that is implemented for a particular wireless communications technology. The mesh network device 900 also includes a power source 926, such as a battery and/or to connect the device to line voltage. An AC power source may also be used to charge the battery of the device.

Figure 10:
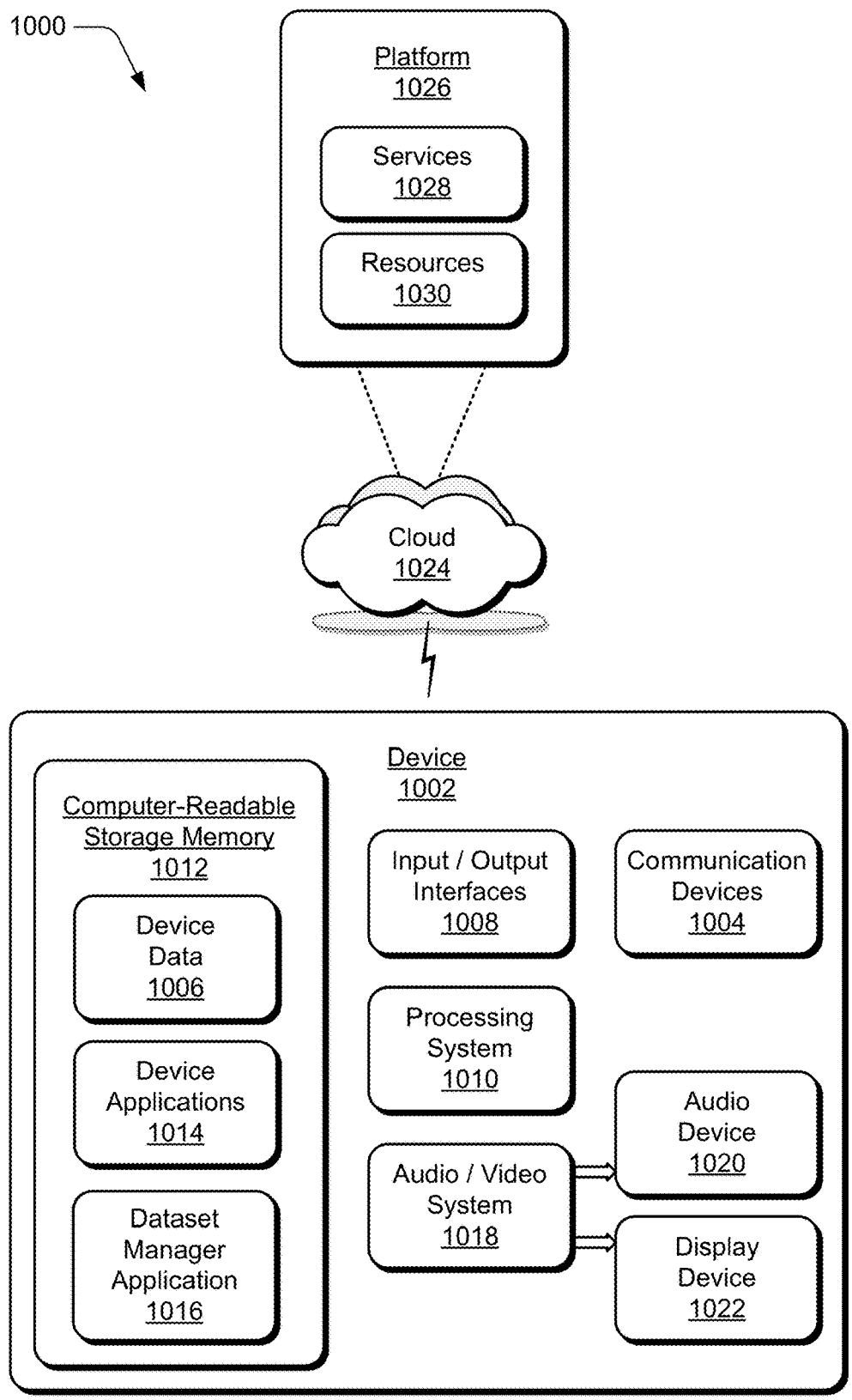
FIG. 10 illustrates an example system with an example device that can implement embodiments of distributed coordination of mesh network configuration updates.

FIG. 10 illustrates an example system 1000 that includes an example device 1002, which can be implemented as any of the mesh network devices that implement embodiments of distributed coordination of mesh network configuration updates as described with reference to the previous FIGS. 1-9. The example device 1002 may be any type of computing device, client device, mobile phone, tablet, communication, entertainment, gaming, media playback, and/or other type of device. Further, the example device 1002 may be implemented as any other type of mesh network device that is configured for communication on a mesh network, such as a thermostat, hazard detector, camera, light unit, commissioning device, router, border router, joiner router, joining device, end device, leader, access point, and/or other mesh network devices.

The device 1002 includes communication devices 1004 that enable wired and/or wireless communication of device data 1006, such as data that is communicated between the devices in a mesh network, data that is being received, data scheduled for broadcast, data packets of the data, data that is synched between the devices, etc. The device data can include any type of communication data, as well as audio, video, and/or image data that is generated by applications executing on the device. The communication devices 1004 can also include transceivers for cellular phone communication and/or for network data communication.

The device 1002 also includes input/output (I/O) interfaces 1008, such as data network interfaces that provide connection and/or communication links between the device, data networks (e.g., a mesh network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 1002 includes a processing system 1010 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1002 may further include any type of a system bus or other data and command transfer system that couples the various components within the device. A system bus can include any one or combination of different bus structures and architectures, as well as control and data lines.

The device 1002 also includes computer-readable storage memory 1012, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 1012 provides storage of the device data 1006 and various device applications 1014, such as an operating system that is maintained as a software application with the computer-readable storage memory and executed by the processing system 1010. The device applications may also include a device manager, such as any form of a control application, software application, signal processing and control module, code that is native to a particular device, a hardware abstraction layer for a particular device, and so on. In this example, the device applications also include a dataset manager application 1016 that implements embodiments of distributed coordination of mesh network configuration updates, such as when the example device 1002 is implemented as any of the mesh network devices described herein.

The device 1002 also includes an audio and/or video system 1018 that generates audio data for an audio device 1020 and/or generates display data for a display device 1022. The audio device and/or the display device include any devices that process, display, and/or otherwise render audio, video, display, and/or image data, such as the image content of a digital photo. In implementations, the audio device and/or the display device are integrated components of the example device 1002. Alternatively, the audio device and/or the display device are external, peripheral components to the example device. In embodiments, at least part of the techniques described for distributed coordination of mesh network configuration updates may be implemented in a distributed system, such as over a "cloud" 1024 in a platform 1026. The cloud 1024 includes and/or is representative of the platform 1026 for services 1028 and/or resources 1030.

The platform 1026 abstracts underlying functionality of hardware, such as server devices (e.g., included in the services 1028) and/or software resources (e.g., included as the resources 1030), and connects the example device 1002 with other devices, servers, etc. The resources 1030 may also include applications and/or data that can be utilized while computer processing is executed on servers that are remote from the example device 1002. Additionally, the services 1028 and/or the resources 1030 may facilitate subscriber network services, such as over the Internet, a cellular network, or Wi-Fi network. The platform 1026 may also serve to abstract and scale resources to service a demand for the resources 1030 that are implemented via the platform, such as in an interconnected device embodiment with functionality distributed throughout the system 1000. For example, the functionality may be implemented in part at the example device 1002 as well as via the platform 1026 that abstracts the functionality of the cloud 1024.

Although embodiments of distributed channel sampling across a mesh network have been described in language specific to features and/or methods, the subject of the appended claims is not necessarily limited to the specific features or methods described. Rather, the specific features and methods are disclosed as example implementations of distributed coordination of mesh network configuration updates, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method of managing commissioning data sets by a wireless mesh network device, the method comprising:
   receiving, at the wireless mesh network device, a pending commissioning dataset including a delay timer value, the pending commissioning dataset usable by the wireless mesh network device for communication on a wireless mesh network partition;
   initializing a delay timer with the delay timer value;
   in response to the delay timer expiring, updating parameters in an active commissioning dataset, at the wireless mesh network device, with values of corresponding parameters included in the pending commissioning dataset to generate an updated active commissioning dataset; and
   operating on the wireless mesh network partition using the updated active commissioning dataset.

2. The method of claim 1, wherein the pending commissioning dataset includes a pending timestamp, the method further comprising:
   in response to the receiving the pending commissioning dataset, comparing the value of the pending timestamp to another pending timestamp from another pending commissioning dataset that is stored in the wireless mesh network device;
   based on the comparing, determining that the pending timestamp is newer than the other pending timestamp; and
   in response to the determining, updating the value of the delay timer to the value of the delay timer included in the pending commissioning dataset.

3. The method of claim 1, wherein the pending commissioning dataset includes a pending timestamp, the method further comprising:
   in response to the receiving the pending commissioning dataset, comparing the value of the pending timestamp to another pending timestamp from another pending commissioning dataset that is stored in the wireless mesh network device;
   based on the comparing, determining that the pending timestamp is older than the other pending timestamp; and
   in response to the determining, sending a copy of the other pending commissioning dataset to a leader device of the wireless mesh network partition, the sending causing the leader device to propagate the other pending commissioning dataset to the wireless mesh network partition.

4. The method of claim 1, wherein the receiving the pending commissioning dataset is in response to the wireless mesh network device initiating joining the wireless mesh network partition.

5. The method of claim 1, wherein the pending commissioning dataset comprises one or more of:
a channel;
a mesh-local prefix;
a network master key; or
a Personal Area Network Identifier (PAN ID).

6. The method of claim 1, further comprising:
receiving a first active commissioning dataset at the wireless mesh network device, the first active commissioning dataset being usable by the wireless mesh network device for communication on the wireless mesh network partition;
comparing an active timestamp included in the first active commissioning dataset with an active timestamp included in a second active commissioning dataset that is stored in the wireless mesh network device;
determining, from the comparing, that the active timestamp included in the second active commissioning dataset is more recent than the active timestamp included in the first active commissioning dataset; and
in response to the determining, transmitting a message to a leader device of the wireless mesh network partition, the message comprising the second active commissioning dataset, the transmitting the message enabling the leader device to accept the second active commissioning dataset as the active commissioning dataset for the wireless mesh network partition, and propagate the second active commissioning dataset to the wireless mesh network partition.

7. The method of claim 1, wherein the wireless mesh network device is a sleepy end device, and wherein the delay timer value is chosen to guarantee that the sleepy end device will receive the pending commissioning dataset.

8. A wireless mesh network device comprising:
a wireless mesh network interface configured for communication in a wireless mesh network;
a memory and processor system to implement a dataset manager application that is configured to:
receive a pending commissioning dataset including a delay timer value, the pending commissioning dataset usable by the wireless mesh network device for communication on a wireless mesh network partition;
initialize a delay timer with the delay timer value;
in response to the delay timer expiring, update parameters in an active commissioning dataset, at the wireless mesh network device, with values of corresponding parameters included in the pending commissioning dataset to generate an updated active commissioning dataset; and
operate on the wireless mesh network partition using the updated active commissioning dataset.

9. The wireless mesh network device of claim 8, wherein the pending commissioning dataset includes a pending timestamp, and wherein the dataset manager application is configured to:
in response to the reception of the pending commissioning dataset, compare the value of the pending timestamp to another pending timestamp from another pending commissioning dataset that is stored in the wireless mesh network device;
based on the comparison, determine that the pending timestamp is newer than the other pending timestamp; and
in response to the determination, update the value of a delay timer to the value of the delay timer included in the pending commissioning dataset.

10. The wireless mesh network device of claim 8, wherein the pending commissioning dataset includes a pending timestamp, and wherein the dataset manager application is configured to:
in response to the reception of the pending commissioning dataset, compare the value of the pending timestamp to another pending timestamp from another pending commissioning dataset that is stored in the wireless mesh network device;
based on the comparison, determine that the pending timestamp is older than the other pending timestamp; and
in response to the determination, send a copy of the other pending commissioning dataset to a leader device of the wireless mesh network partition, the sending causing the leader device to propagate the other pending commissioning dataset to the wireless mesh network partition.

11. The wireless mesh network device of claim 8, wherein the reception of the pending commissioning dataset is in response to the wireless mesh network device initiating joining the wireless mesh network partition.

12. The wireless mesh network device of claim 8, wherein the pending commissioning dataset comprises one or more of:
a channel;
a mesh-local prefix;
a network master key; or
a Personal Area Network Identifier (PAN ID).

13. The wireless mesh network device of claim 8, wherein the dataset manager application is configured to:
receive a first active commissioning dataset, the first active commissioning dataset being usable by the wireless mesh network device for communication on the wireless mesh network partition;
compare an active timestamp included in the first active commissioning dataset with an active timestamp included in a second active commissioning dataset that is stored in the wireless mesh network device;
determine, from the comparison, that the active timestamp included in the second active commissioning dataset is more recent than the active timestamp included in the first active commissioning dataset; and
in response to the determination, transmit a message to a leader device of the wireless mesh network partition, the message comprising the second active commissioning dataset, the transmission of the message enabling the leader device to accept the second active commissioning dataset as the active commissioning dataset for the wireless mesh network partition, and propagate the second active commissioning dataset to the wireless mesh network partition.

14. The wireless mesh network device of claim 8, wherein the wireless mesh network device is a sleepy end device, and wherein the delay timer value is chosen to guarantee that the sleepy end device will receive the pending commissioning dataset.

15. A wireless mesh network system, comprising:
a wireless mesh network device configured for communication on a wireless mesh network partition, the wireless mesh network device configured to:
- receive a pending commissioning dataset including a delay timer value, the pending commissioning dataset usable by the wireless mesh network device for communication on the wireless mesh network partition;
- initialize a delay timer with the delay timer value;
- in response to the delay timer expiring, update parameters in an active commissioning dataset, at the wireless mesh network device, with values of corresponding parameters included in the pending commissioning dataset to generate an updated active commissioning dataset; and
- operate on the wireless mesh network partition using the updated active commissioning dataset.

16. The wireless mesh network system of claim 15, wherein the pending commissioning dataset includes a pending timestamp, and wherein the wireless mesh network device is configured to:
- in response to the reception of the pending commissioning dataset, compare the value of the pending timestamp to another pending timestamp from another pending commissioning dataset that is stored in the wireless mesh network device;
- based on the comparison, determine that the pending timestamp is newer than the other pending timestamp; and
- in response to the determination, update the value of a delay timer to the value of the delay timer included in the pending commissioning dataset.

17. The wireless mesh network system of claim 15, further comprising:
a leader device configured to maintain commissioning datasets for the wireless mesh network;
wherein the pending commissioning dataset includes a pending timestamp, and wherein the wireless mesh network device is configured to:
- in response to the reception of the pending commissioning dataset, compare the value of the pending timestamp to another pending timestamp from another pending commissioning dataset that is stored in the wireless mesh network device;
- based on the comparison, determine that the pending timestamp is older than the other pending timestamp; and
- in response to the determination, send a copy of the other pending commissioning dataset to the leader device, the sending causing the leader device to propagate the other pending commissioning dataset to the wireless mesh network partition.

18. The wireless mesh network system of claim 17, wherein the wireless mesh network device is configured to:
- receive a first active commissioning dataset, the first active commissioning dataset being usable by the wireless mesh network device for communication on the wireless mesh network partition;
- compare an active timestamp included in the first active commissioning dataset with an active timestamp included in a second active commissioning dataset that is stored in the wireless mesh network device;
- determine, from the comparison, that the active timestamp included in the second active commissioning dataset is more recent than the active timestamp included in the first active commissioning dataset; and
- in response to the determination, transmit a message to the leader device, the message comprising the second active commissioning dataset, the transmission of the message enabling the leader device to accept the second active commissioning dataset as the active commissioning dataset for the wireless mesh network partition, and propagate the second active commissioning dataset to the wireless mesh network partition.

19. The wireless mesh network system of claim 15, wherein the reception of the pending commissioning dataset is in response to the wireless mesh network device initiating joining the wireless mesh network partition.

20. The wireless mesh network system of claim 15, wherein the pending commissioning dataset comprises one or more of:
a channel;
a mesh-local prefix;
a network master key; or
a Personal Area Network Identifier (PAN ID).

* * * * *